United States Patent
Chapman, Jr.

(10) Patent No.: US 6,419,188 B1
(45) Date of Patent: Jul. 16, 2002

(54) MOVABLE INSTRUMENT PANEL WITHIN A COCKPIT OF AN AIRCRAFT

(76) Inventor: W. Cullen Chapman, Jr., 414 Second St., No. 207, Hermosa Beach, CA (US) 90254-4669

(*) Notice: Subject to any disclaimer, the term of this patent is extended or adjusted under 35 U.S.C. 154(b) by 0 days.

(21) Appl. No.: 09/621,317

(22) Filed: Jul. 20, 2000

(51) Int. Cl.$^7$ .............................................. B64D 25/02
(52) U.S. Cl. ............................... 244/118.6; 244/122 R; 244/122 AG; 244/129.1
(58) Field of Search .......................... 244/118.5, 118 C, 244/122, 129.1, 122 AG, 122 A, 121; 297/216.1, 487–488, 465–466, 173, 188; 350/254, 248, 229; 280/748–749

(56) References Cited

U.S. PATENT DOCUMENTS

| | | | |
|---|---|---|---|
| 1,710,476 A | 4/1929 | Hall | |
| 4,511,104 A | 4/1985 | Meyer | |
| 4,529,150 A | 7/1985 | Owen et al. | |
| 4,568,122 A | * 2/1986 | Kain | .................. 297/216.1 |
| 4,763,860 A | 8/1988 | Vauvelle et al. | |
| 4,787,576 A | * 11/1988 | McGrady et al. | ....... 244/122 R |
| 4,832,287 A | 5/1989 | Werjefelt | |
| 4,877,202 A | * 10/1989 | Disselkoen, Jr. et al. | ... 244/122 A |
| 4,925,240 A | 5/1990 | Peters | |
| 4,961,548 A | 10/1990 | Adams et al. | |
| 5,177,616 A | * 1/1993 | Riday | ........................ 358/254 |
| 5,179,447 A | 1/1993 | Lain | |
| 5,224,861 A | 7/1993 | Glass et al. | |
| 5,275,465 A | 1/1994 | Gulliver et al. | |
| 5,297,761 A | * 3/1994 | Kendall, Jr. et al. | ........ 244/140 |
| 5,490,710 A | 2/1996 | Dearing et al. | |
| 5,588,697 A | 12/1996 | Yoshida et al. | |
| 5,765,910 A | 6/1998 | Larkin et al. | |
| 5,765,911 A | 6/1998 | Sorenson | |
| 5,947,515 A | * 9/1999 | Fitch | ...................... 297/216.1 |
| 6,073,885 A | * 6/2000 | Winkler | ................. 244/122 R |
| 6,224,018 B1 | * 5/2001 | Hinestroza | .................. 244/121 |

\* cited by examiner

*Primary Examiner*—Galen L. Barefoot
(74) *Attorney, Agent, or Firm*—Squire, Sanders & Dempsey L.L.P.

(57) ABSTRACT

The present invention includes an instrument panel that is adapted to stand over the lap of a pilot within a cockpit of an aircraft to make more efficient use of the limited space within the cockpit. The panel houses at least a portion of the instruments that are installed in the cockpit to fly the aircraft. More efficiently use of the space within the cockpit reduces the size and weight of the cockpit. Moreover, reducing the weight of the cockpit allows the cockpit with the canopy to be ejected from the aircraft rather than just the pilot seat. The cockpit enclosed by the canopy ejects the pilot faster and protects the pilot during and after the ejection. The ejection is faster because there is no need to remove the canopy before ejecting the seat. The pilot is further protected because the canopy protects the pilot from wind impact and harsh atmospheric conditions at high altitude.

41 Claims, 7 Drawing Sheets

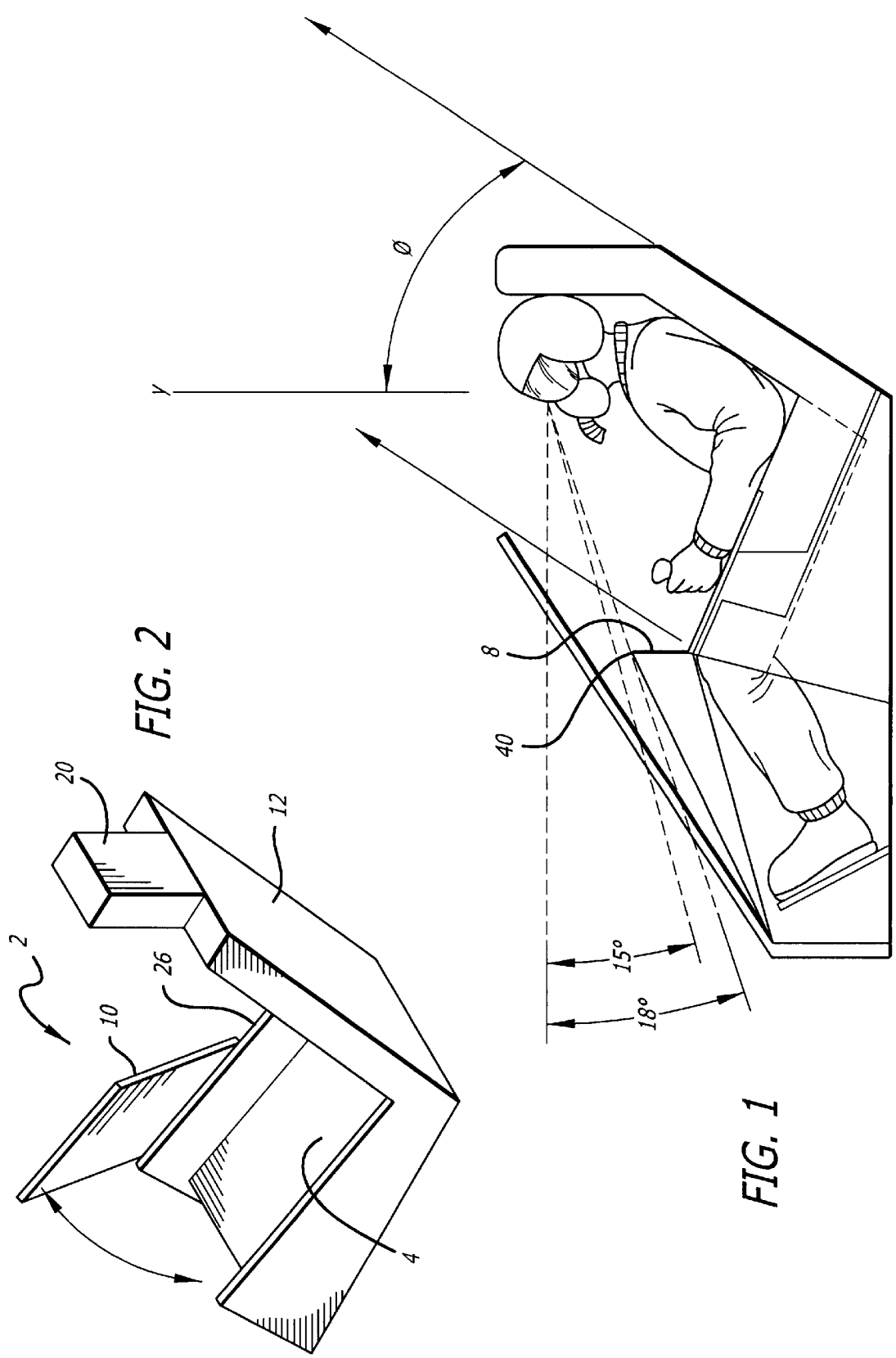

FIG. 7
*PRIOR ART*
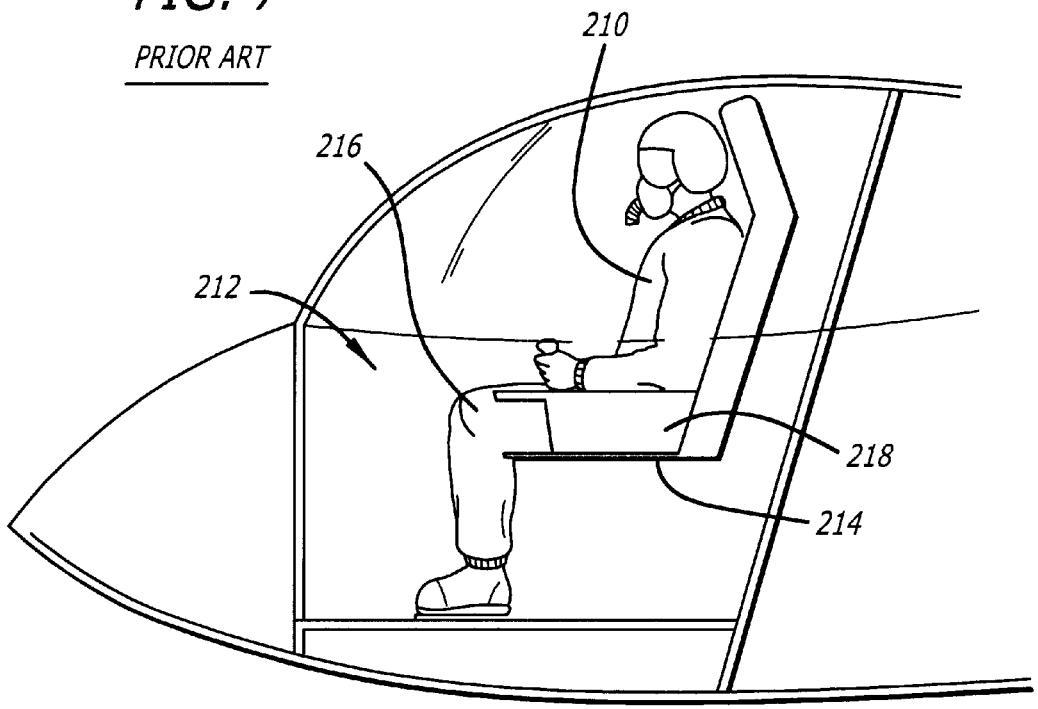
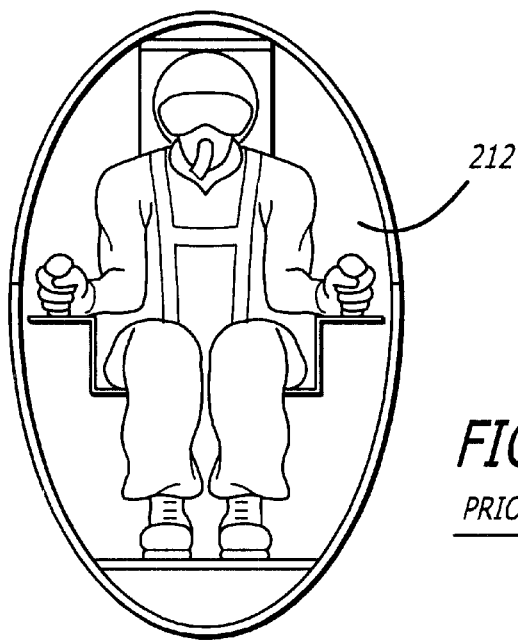
FIG. 9
*PRIOR ART*

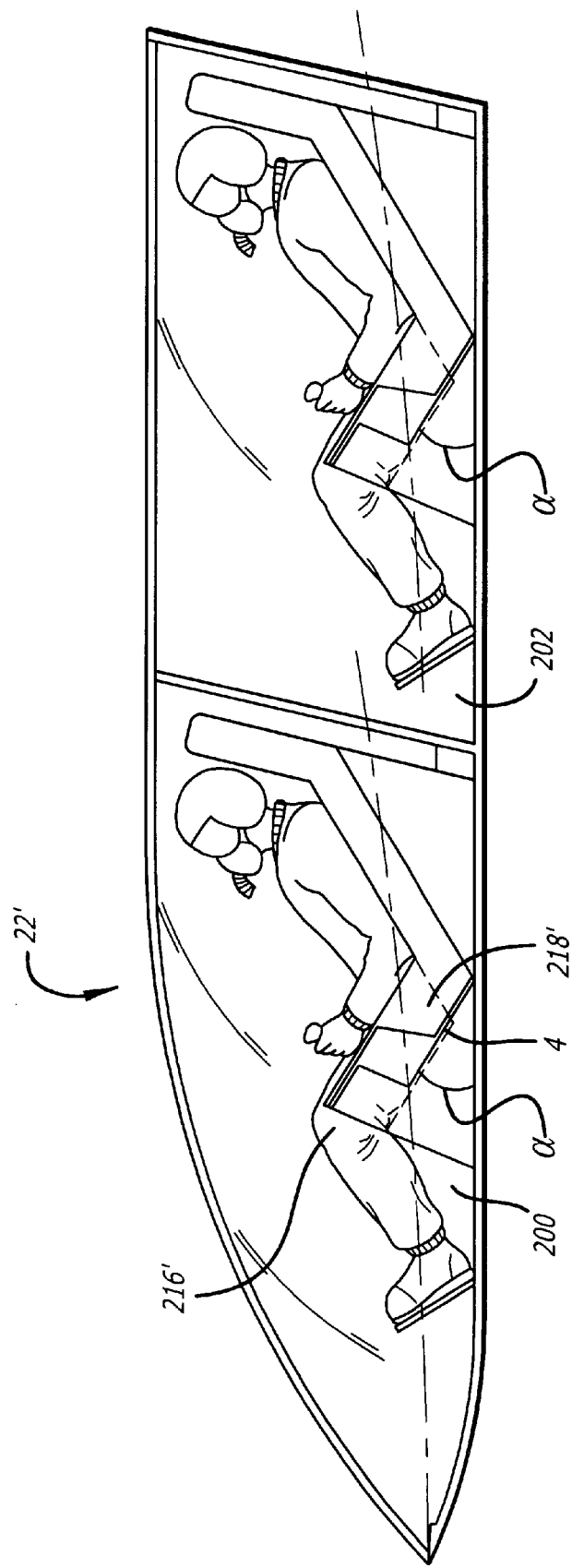

MOVABLE INSTRUMENT PANEL WITHIN A COCKPIT OF AN AIRCRAFT

BACKGROUND OF THE INVENTION

1. Field of Invention

This invention relates generally to a moveable panel within a cockpit of an aircraft and, more particularly, utilizing a moveable panel housing instruments over the lap of a pilot within an escape capsule to economically design the escape capsule that is small enough to eject the entire escape capsule from the aircraft to safely eject the pilot from the aircraft.

2. Description of the Related Art

There are number of design criteria for designing an aircraft. One of the more important criteria is the weight, i.e., designing a lightest possible aircraft without sacrificing the performance. Another design criteria in the case of fighter jet is that the pilot must have at least 15° to 18° of visibility below the horizontal plane through the canopy of the aircraft (the 18° requirement). However, the front console having a certain height is in line with the pilot's view so that the pilot must sit a substantially upright position to see over the front console to satisfy the 18° visibility requirement. In other words, there is a limit as to how far a pilot's seat can lean back. With today's cockpit design, because of the height level of the front dashboard, the pilot seat can only lean back about 15° to 30° from the vertical plane. This is generally due to limited space within the cockpit to install all of the instruments and the pilot seat, in order to reduce the weight of the cockpit. However, there are several shortcomings to having a pilot seat that can only lean back about 30°. One of the shortcomings is that the profile and frontal area of a canopy enclosing the cockpit is limited by the upright position of the seat. This means that the profile of the canopy can not be lowered to reduce the drag on the cockpit. Moreover, higher canopy profile also means more space within the cockpit to heat and cool the air, which means more powerful and heavier auxiliary equipment to control the air within the cockpit.

Another shortcoming with the pilot seat that can only lean back about 30° is that the pilot is subject to more gravity (G) force than a seat that can lean back further. That is, as the pilot sits in more of an upright position, pilot's blood becomes so heavy that the hydraulic pressure produced by the pilot's heart can not compensate for the blood draining out of the pilot's head. Under such circumstances, the pilot may blackout. For example, even with an antigravity suit, many pilots may take about 8 Gs before blacking out. On the other hand, a pilot seat that can lean back beyond 30° would decrease the blood draining out of the pilot's head because the pilot's head and heart are in a more level position. Put differently, when the pilot is sitting in a substantially upright position there may be a vertical difference of about 2 feet between the head and the heart of the pilot; whereas in a lay back position, i.e., beyond 30°, there may be a difference of about 6 inches. In other words, it is much easier for the heart pump blood 6 inches vertically than 2 feet to pilot's head, so that the pilot can handle greater G force. A pilot's ability to handle greater G force would allow the pilot to make more aggressive maneuvers, which could make the difference between winning or losing a dogfight in the air.

In an emergency situation, a pilot may have to eject from the cockpit. However, there is a limit as to how fast the pilot can be ejected from the cockpit because the pilot's spine can only take so much G force before the disk in between the vertebrae in the spine will rupture. On the other hand, as discussed above, a pilot seat that can lean further back would allow the pilot to handle greater G force so that the pilot can escape from the cockpit faster.

Moreover, during the ejection every split second counts. However, before a pilot can be ejected, pilot's arms and legs are pulled in by a strap means and held close to the seat so that the arms and legs do not get sheared off. Also, the canopy has to be ejected or shattered before the pilot can be ejected which takes up additional valuable time. Also, once ejected, pilots are exposed to the elements such that it may cause serious injury to the pilots. For example, pilots are limited to ejection at speeds below 700 mph; otherwise the impact from the wind may kill them. Furthermore, pilots may be subject to thunder, hail, and, at high altitudes, subject to severe cold and lack of oxygen.

Therefore, there still is a need for a pilot seat that can lean beyond 30° from the vertical plane to allow the pilot to take more G force, without increasing the size of the cockpit. Moreover, in the case of an emergency, a need to eject the pilot from the fighter jet faster and more safely.

BRIEF SUMMARY OF THE INVENTION

One of the features of the present invention is to recline the pilot seat further back beyond 60° from the vertical plane. Reclining the pilot seat further back has a number of advantages, such as being able to lower the profile and frontal area of the cockpit to reduce the drag and the weight of the aircraft and the cockpit. Moreover, since the pilot seat can learn further back, the pilot can handle greater G-forces because the force being applied to the pilot is more evenly distributed throughout the pilot's body.

To accomplish the above feature, the height of the front console sometimes referred to as the "coming" is lowered by moving the instruments from the front console to a movable panel that extends across the lap of a pilot. By lowering the coming, the pilot seat can be further reclined and still maintain the 18° view requirement over the now lowered coming. Furthermore, the reclined position reduces the frontal area, and the profile of the cockpit, which reduces drag. Moreover, weight is reduced due to the fact that the cockpit volume is smaller and less auxiliary equipment is required to heat or cool air within the cockpit. The reclined position also allows the pilot to endure greater G-forces since the pilot is in a more leveled position.

Another feature of the present invention is to provide an escape capsule for fighter jets that provides safer means of ejecting a pilot. This feature is also accomplished in part by the movable panel, which efficiently utilizes the space around the pilot so that a compact escape capsule may be designed to eject the entire escape capsule from the aircraft with a pilot(s) safely inside the capsule. That is, the compact design of the capsule is facilitated by the fact that (1) the seat may reclined further by about 60° or more, which lowers the profile and frontal area of the capsule; (2) placing the movable panel over the lap or thighs of the pilot allows knee caps and toes to be moved up to the pilot's vision lines so that the height of the capsule may be reduced; and (3) lowering the profile and reducing the length of the capsule, of course, reduce the weight of the capsule so that it is more feasible to eject the capsule from the aircraft. There are numerous advantages to such an ejection system, such as: (1) the pilot may now eject at higher speed and/or altitude; (2) faster ejection time because there is no need to retract the pilot's arms and legs, and the pilot can tolerate greater G-forces during ejection; (3) protection from extreme elements such as cold, rain, hail, lightning, lack of air supply, and the explosion of the airplane, and no need to removed the canopy before ejecting the pilot; (4) protection the pilot during landing after the ejection; and (5) smaller environmental loads due to the smaller volume of the capsule, i.e., smaller auxiliary equipment can be used.

In accordance with one aspect of the present invention, these and other features are accomplished by providing a panel having an edge, the edge of the panel pivotally couple to a capsule, wherein the panel pivots between a first position and a second position, wherein the panel houses at least a portion of the instruments in the capsule, wherein: in the first position, the panel is in substantially an upright position; and in the second position, at least a portion of the panel extends across a thigh support of a seat.

In accordance with another aspect of the present invention, these features are accomplished by providing a panel having an edge; wherein the edge of the panel is adapted to movably couple within a capsule between a first position and a second position, wherein: the panel in the first position, a pilot is able to sit into a pilot seat within the capsule; and the panel in the second position, at least a portion of the panel extends across a thigh support of the pilot seat within the capsule.

In accordance with yet another aspect of the present invention, these features are accomplished by providing a first capsule; a first seat within the first capsule; and a first canopy adapted to enclose the first capsule, the first capsule adapted to eject from an aircraft with a pilot sitting on the first seat enclosed by the first canopy, whereby the enclosed first capsule protects the pilot inside from the environment during the ejection.

In accordance with still another aspect of the present invention, these features are accomplished by providing a capsule adapted to separate from an airplane, the capsule adapted to protect a pilot within the capsule from the environment, wherein the capsule includes a seat for the pilot; and separating the capsule from the airplane.

The above described and many other features and attendant advantages of the present invention will become apparent from a consideration of the following detailed description when considered in conjunction with the accompanying drawings.

BRIEF DESCRIPTION OF THE DRAWINGS

Detailed description of the preferred embodiment of the invention will be made with reference to the accompanying drawings.

FIG. 1 is a perspective view illustrating an exemplary movable panel associated with a pilot seat according to one embodiment of the present invention;

FIG. 2 is a side view of a pilot seat in a reclined position according to one aspect of the present invention;

FIG. 7 is a side view of a traditional cockpit of an aircraft;

FIG. 8 is a side view of cockpit capsule for two pilots according to yet another embodiment of the present invention;

FIG. 9 is a front view of a traditional cockpit of an aircraft; and

DETAILED DESCRIPTION OF THE INVENTION

Figure 3:
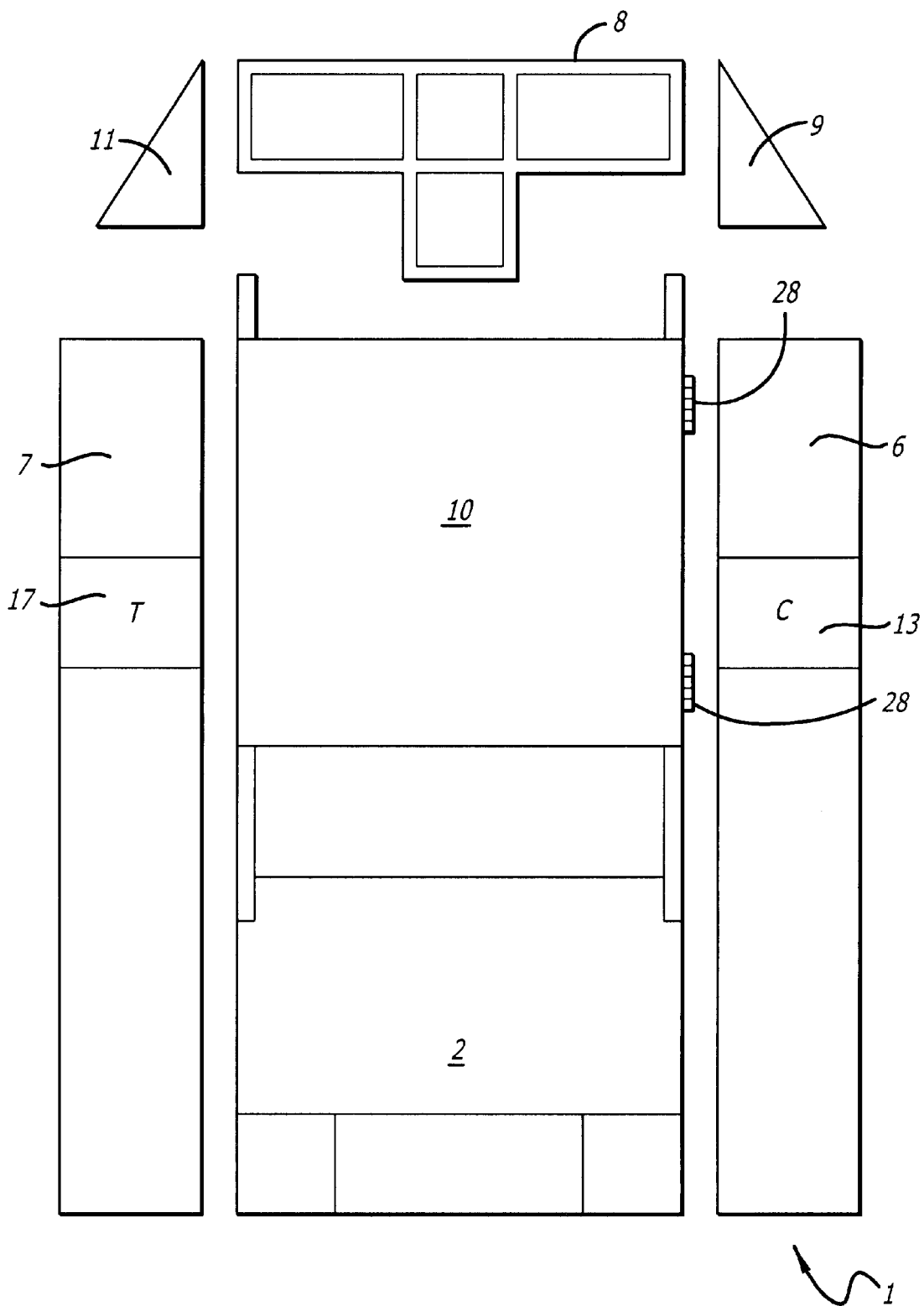
FIG. 3 is a top view of a movable panel in a down position relative to a pilot seat according to one aspect of the present invention.

This description is not to be taken in a limiting sense, but is made merely for the purpose of illustrating the general principles of the invention. The section titles and overall organization of the present detailed description are for the purpose of convenience only and are not intended to limit the present invention.

One aspect of the present invention is to provide an instrument panel that is adapted to lay over the lap of a pilot within a cockpit of an aircraft to make more efficient use of the limited space within the cockpit. The panel houses at least a portion of the instruments that are used to fly the aircraft. For example, much of the instruments in the front console, if not all, may be installed in the panel to lower the front console or sometimes called the "coming" to make more efficient use of the space around the pilot. This way, the size and weight of the cockpit may be substantially reduced. Moreover, the panel may be adapted to move out of the way of the pilot seat so that a pilot may ingress and egress from the pilot seat; however, once the pilot sits down to the pilot seat, the panel may be positioned over the lap of the pilot so that the pilot may monitor the instruments.

With at least a portion of the instruments housed in the panel, less space is now required in the front console, and therefore the coming can be lowered. This allows the pilot to further recline the pilot seat and still maintain the required 18° visibility below the horizontal plane over the coming. That is, with the present invention, the pilot seat can further recline, which has a number of advantages. For example, the profile of the cockpit may be reduced because the pilot does not need to sit in a substantially upright position. Lowering the profile reduces the drag and reduces weight of the cockpit. Furthermore, the pilot can handle greater G-forces during aggressive maneuvers because the G-force is more evenly distributed throughout the pilot's body in the reclined position.

As illustrated by way of example in FIGS. 1–5, one embodiment of the present invention includes a movable panel 10 that is adapted to couple to a cockpit seat 2. The cockpit seat includes a thigh support 4 and a seat back 12. The seat back 12 may further include a head rest 20 that is integrated into the seat or attached to the seat back 12 itself. As further illustrated in FIG. 2, the seat back 12 may be adjustable for rake positions that allows a pilot to see at least 18° below the horizontal plane over a coming 40, i.e., to satisfy the 18° visibility requirement. Moreover, since at least a portion of the instruments, if not all, that would normally have been incorporated into the front console 8 are now in the movable panel 10, less space is now required in the front console 8. This means that the coming 40 is now also lower, so that the 18° visibility requirement can be more easily satisfied. In other words, with the lower front console, the pilot does not need to sit in an elevated position to see over the coming 40. Accordingly, the seat back 12 can be further leaned back and still satisfy the 18° visibility requirement.

An exemplary layout of the cockpit 1 is illustrated by way of example in FIG. 3, with the seat 2 in the center surrounded by the front console 8, right console 6, left console 7, and right and left corner sections 9 and 11, respectively. Moreover, FIG. 3 shows the movable panel 10 in the second position substantially extending across the thigh support 4. As further illustrated in the perspective view FIG. 5 and the side view of FIG. 6, the front console 8 is generally deeper than the rest of the consoles, especially between the legs of the pilot. Accordingly, the instruments that require deeper housing space are installed in the front console, such as, a deep cathode-ray tube Q used for computer display screen and head-up display optics 100. Moreover, the head-up display optics may be positioned so that the images from the cathode-ray tube Q substantially projects into the eyes of the pilot. In the right and left corner sections 9 and 11, deep switches and gauges may be installed to take advantage of the deep space in the corner sections as well. In the right console 6 there may be a control stick 13, and in the left consoles 7 there may be a throttle stick 17, or vice versa. Furthermore, along with the control stick and the throttle stick, there may be other instruments on the right and left consoles.

Figure 5:
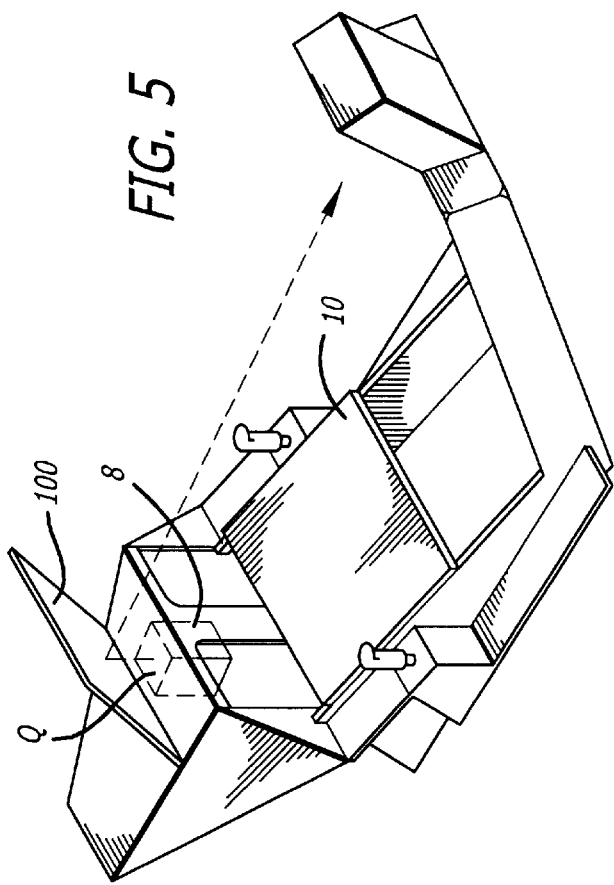
FIG. 5 is a perspective view of a movable panel associated with a pilot seat and a display panel according to yet another embodiment of the present invention.

Moreover, as illustrated in FIG. 5, all of the instruments from the front console 8 may be moved to the moveable panel 10, so that the front console now may not have any instruments at all. Of course, if needed, instruments may be placed in the front console 8. Note that deeper instrument and/or display panels may be installed between the legs of the pilot on the front console 8.

With regard to the instruments installed in the movable panel 10, they are generally shallow because the instruments can not be deeper than the depth of the panel. For example, the panel may be less than about 4 inches deep, this means that the instruments installed in the panel 10 have to be less than 4 inches deep. However, with the advancement in the solid state instruments and liquid crystal displays that reduce the size of the instruments and displays, most if not all of the instruments, may be installed in the panel. For example, flat panel monitors, shallow switches, solid state controls, solid state foldable fly-by-wire control stick, and displays may be installed in the movable panel. In other words, any type of controls or displays more existing and/or developed in the future, within a predetermined size requirement may be incorporated into the panel.

Figure 4:
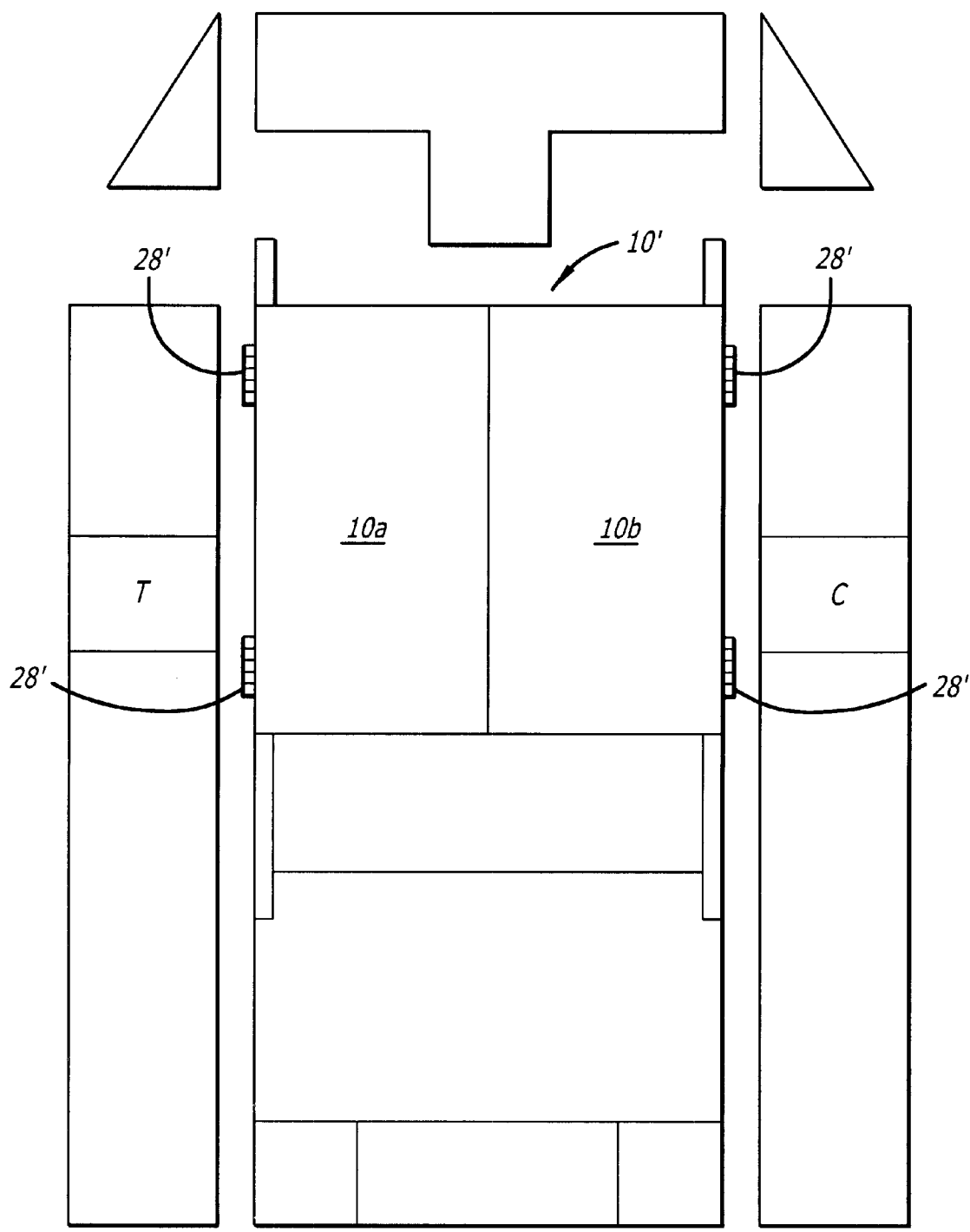
FIG. 4 is a top view of a pair of movable panels in a down position relative to a pilot seat according to another embodiment of the present invention.

As further illustrated in FIGS. 2 and 4, the movable panel 10 may be pivotally coupled to the cockpit seat 2 or to a cockpit wall. Furthermore, the panel may be movable between first and second positions. In the first position, the panel is out of the way to allow a pilot to ingress and egress from the seat. In other words, the thigh support 4 of the cockpit seat is substantially exposed to allow the pilot to ingress and egress from the seat. As illustrated in FIG. 3, in the second position, at least a portion of the movable panel 10 is positioned over the thigh support 4. In particular, the panel 10 may be moved so that it is substantially parallel to the thigh support 4.

Accordingly, once the pilot ingress to the pilot's seat, as shown in FIG. 1, the movable panel 10 substantially extends across the lap of the pilot, with the instruments on the panel facing the pilot. Of course, the surface area of the panel may vary depending on the size of the cockpit.

The movable panel 10 may be coupled to any place and by any means within the cockpit to allow the pilot to ingress and egress from the pilot seat. As discussed above, the panel in the first position allows the pilot to ingress and egress from the pilot's seat, but in the second position the panel substantially extends over the thigh support 4. For example, as illustrated in FIG. 3, a pair of hinges 28 may be used to pivotally couple the panel to the side wall 26 of the seat 2 (see FIG. 2). Another example may be to pivotally couple the panel to the side wall of the cockpit itself and not the side wall of the seat. Moreover, the panel need not be coupled to the side walls, rather an adapter (not shown) may be used to couple the panel to floor of the cockpit, and allow the panel to move between the first and second positions.

Yet another alternative embodiment is to releasably couple the panel within the cockpit. In other words, in the first position, the panel may be disengaged or removed from the cockpit, so that the pilot can either ingress or egress from the pilot seat. Once the pilot ingress to the pilot seat, the panel may be engaged into the second position. That is, an assistant or the pilot may releasably couple the panel within the cockpit so that the panel is substantially over the lap of the pilot. When the pilot is ready to egress from the pilot seat, the panel may be moved to the first position, i.e., the panel may be released from the second position and removed from the cockpit. Furthermore, the panel may be adapted with a connector apparatus to electrically couple to the cockpit, or vice versa. That is, it is within the scope of the present invention to electrically and/or communicably couple the panel to the cockpit by any methods known to one of ordinarily skilled in the art or any methods that may be developed in the future.

Still another alternative embodiment is to releasably couple the panel within the cockpit yet movable between the first position and the second position. In other words, in the first position, the panel may be either disconnected from the cockpit, or releasably coupled within the cockpit yet out of the way to allow the pilot to ingress and egress from the pilot seat. For example, in the first position, the panel may be releasably coupled within the cockpit yet in a substantially upright position to allow the pilot to ingress to the seat. Moreover, in the second position, the panel may be substantially over the lap of the pilot yet releasable from the cockpit.

Even further, as illustrated by way of example in FIG. 4, another embodiment of the present invention is to have a panel 10' that is divided into at least two pieces 10a and 10b, rather than being a unitary piece as shown in FIG. 3. For example, the panels 10a and 10b may be pivotally coupled to their respective side walls via a pair of hinges 28' on each side. Thus, in the first position, the panels 10a and 10b both open up; and in the second position, the panels 10a and 10b are in the closed position. One of the advantages with this embodiment is that when the panels 10a and 10b are in the first position, the panels 10a and 10b do not stand as high and, therefore it is easier to ingress and egress from the seat.

Yet still another embodiment is to have a panel that is more ergonomically configured. For example, the edge of the panel that is adjacent to the pilot may have a concave shape (not shown) contouring around the waist of the pilot, versus a straight edge as illustrated in FIGS. 3 and 5.

As a result of moving instruments from the front console to the movable panel, the coming is reduced which allows the pilot's seating position to be reclined yet still satisfying the 18° visibility requirement over the coming. There are number of advantages to having the seat back 12 that can reclined beyond 60° from the vertical plane unlike today's fighter aircraft's pilot seat. For example, as the seat back reclines further back, this lowers the profile and frontal area of the cockpit, which reduces drag on the cockpit. Moreover, since there is less space in the cockpit, the auxiliary equipment may consume less energy to control the air within the cockpit. Still further, smaller auxiliary equipment may now be used to reduce the weight, and the space needed to install the equipment. Furthermore, since the pilot is sitting in a more reclined position, the G-force applied to the pilot during flight is more evenly distributed throughout the pilot's body and, therefore the pilot can handle greater G-force to make more aggressive moves. As evident here, improving the design of the cockpit in one area leads to improving the design or performance in other areas so that the net sum gain is much greater than the improvement made in any one particular area.

There are number of other advantages to having a movable panel. For instance, one of the design criteria of the cockpit is to safely eject the pilot in case of an emergency. To safely eject the pilot, cockpits are design with enough space in front of the pilot to allow the pilot to escape without injury. However, before being ejected, pilot's arms and legs are pulled in by a strap means and held close to the seat. This is design to prevent the pilot's arms and legs from catching any part of the cockpit. With the present invention, a number of instruments and displays are now installed in the panel rather than the front console so that the front console may be smaller, which means that more space is now available in front of the pilot. Accordingly, with the movable panel, the space in front of the pilot is more efficiently utilized. Therefore the size of the cockpit may be further reduced because there are less instruments in front of the pilot. Of course, a smaller cockpit also means reducing the weight of the cockpit.

In case of ejection, the movable panel 10 may be raised, as shown in FIG. 1, so that a pilot can safely escape without injuring to his legs. Alternatively, the movable panel 10 may be ejected with the cockpit seat as shown in FIG. 2. In the later method, eliminating the need to raise the panel 10 prior to ejection of a pilot saves time. Moreover, the cockpit may be equipped with an emergency detection system, so that in case of an emergency, the system automatically ejects the pilot seat. The ejection signal may be provided by a variety of detection forms, such as radar systems, electronic devices, manual input, or other means known by others skilled in the art.

When ejecting from the cockpit, there are number of other factors, besides the space within the cockpit that determines the safety of the pilot. For example, before ejecting, pilot's arms and legs have to pull in, and then the canopy has to be ejected. All of the above steps take precious time where every split second counts in an emergency situation. Moreover, even after extricating from the cockpit, the pilot is still subject to the elements such as the impact from the wind, thunder, hail, and, at high altitudes severe cold and lack of oxygen.

Figure 6:
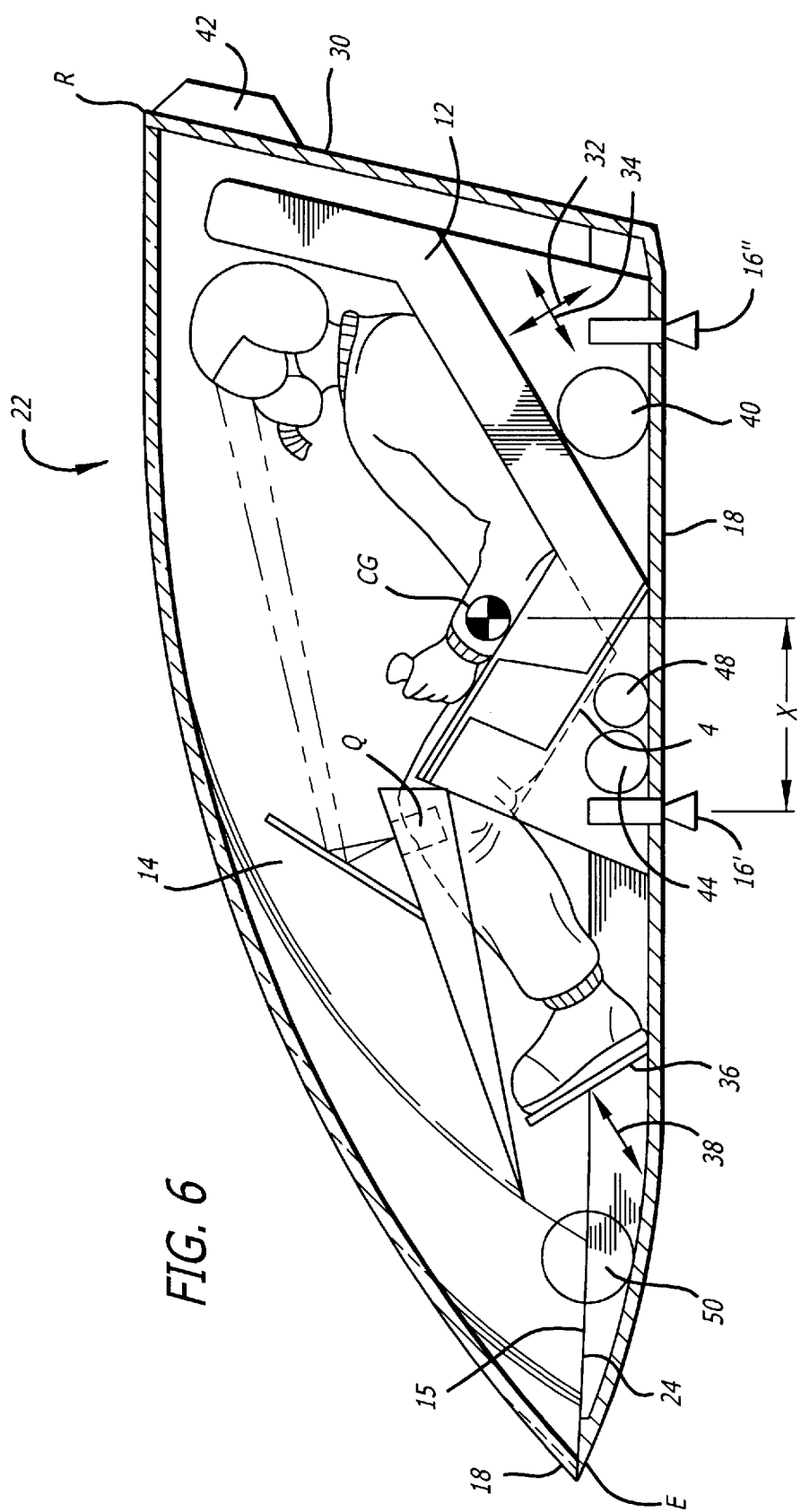
FIG. 6 is a cross-sectional side view of cockpit capsule according to still another embodiment of the present invention.

However, with an escape cockpit capsule 22 (capsule), as illustrated by way of example in FIG. 6, the safety of the pilot is greatly improved by eliminating much of the risk associated with ejecting the pilot seat from the cockpit. In this embodiment, the capsule not only protects the pilot from the elements but also allows for a faster ejection. Again, the movable panel 10 allows for an efficient utilization of space within the capsule so that a smaller size capsule takes place of the lager traditional cockpit and, therefore the capsule weights less than the cockpit. That is, reduced weight of the capsule makes it feasible to eject the capsule from the fighter jet. In other words, in this embodiment, the light weight capsule with the pilot inside gets ejected rather than the pilot strapped to the pilot seat.

As illustrated in FIG. 6, the capsule 22 includes a canopy 14 and a cockpit 18. The canopy 14 forming the upper shell has a lip 15, and the cockpit 18 forming the lower shell has an outer edge 24. When the cockpit capsule is in the closed position, the lip 15 of the capsule mates with the edge 24 to form a tight seal around the edge 24 of the cockpit 18. The cockpit capsule may further include a back frame 30 to enclose the aft side of the cockpit capsule. However, it is within the scope of the present invention to have a canopy that completely encloses the cockpit without the back frame. In this embodiment, the canopy 14 may pivot about a leading edge "E" pivotally coupled to the front of the cockpit 18. Alternatively, the canopy 14 may pivot along the axis "R" at the rear of the cockpit capsule 22. It should be noted that the canopy may be design to pivot about any other axis, as known to one of ordinarily skilled in the art.

To separate the cockpit capsule 22 from the aircraft, the cockpit capsule may be equipped with at least one rocket 16'. The power and the number of the rockets that are used of course depend on the weight of the cockpit capsule 22. In particular, as illustrated by way of example in FIG. 6, if a single rocket 16' is used to eject the capsule 22 from the aircraft, the rocket 16' may be positioned a predetermined distance X ahead of the center of gravity (C.G.) of the capsule 22 so that the nose of the capsule is lifted off of the aircraft first once the rocket is ignited. This creates a gap between the nose of the capsule and the aircraft to allow the wind pressure to get underneath the capsule to lift the capsule off of the aircraft. That is, by placing the rocket 16' ahead of the C.G. of the capsule, the capsule is ejected from the power of rocket and the lift pressure underneath the capsule.

Moreover, as illustrated in FIG. 6, where at least two rockets 16' and 16" are used to lift the capsule 22, the front rocket 16' may be ahead of the C.G. of the capsule 22, and may be fired before the aft rocket 16" so that the nose of the capsule is lifted off of the aircraft first. For example, the front rocket 16' may fire about one millisecond (0.01 second) to about one tenth of a second (0.1 second) ahead of the aft rocket 16". Of course, the difference in timing may vary depending on the application. Alternatively, the front rocket 16' may be slightly more powerful than the aft rocket 16" so that even if the two rockets are fired at the same time, the nose of the capsule will lift first. Still another alternative is to have the front rocket 16' fire first and be more powerful than the aft rocket 16'.

Moreover the pilot seat within the cockpit capsule 22 may be adjustable to many positions to adapt to a particular anatomical physic of the pilot. For example, the seat back 12 can be adjusted back and forth as indicated by the double arrow sign 32, and up and down as indicated by the double arrow sign 34. Still further, the seat back 12 may be adjustable to recline at least beyond 40° to about 60° from the vertical plane. As discussed above, being able to recline beyond 40° allows the pilot to take greater G-forces. A pedal 36 may be adjusted as well, which can be adjusted substantially along the axis of pilot's tibia, as indicated by the double arrow 38.

As illustrated by way of example in FIG. 6, to economically utilize the space within the cockpit capsule 22, a survival gear 40 and a parachute pack 42 may be placed behind the seat back 12. Moreover, underneath the thigh support 4, other equipment like an emergency transmitter 44 and oxygen supply equipment 48 may be placed. Near the tip of a nose cone 18 other equipment like a flotation bag 50 may be installed. Alternatively, other items like a GPS (ground positional sensor), emergency rationing, survival equipment, gun and parka may be stored within the cockpit capsule. In other words, one of the advantages with the present invention is that all of the equipment that would normally attached an ejection seat may now be evenly distributed within the cockpit capsule. This allows for a balanced weight distribution of the equipment within cockpit capsule, and a less complicated design of the cockpit seat 2.

With regard to the shape of the cockpit capsule 22, it may be ballistically shaped, i.e. substantially conical. In other words, the cockpit capsule 22 may be like a shell casing with a canopy top. As illustrated by way of example in FIG. 10, the overall profile "P" of the cockpit capsule 22 may be about 2 feet to about 3 feet, which allows the back seat 12 to lean back between from about 30° to about 60° or more. The width "W" of the cockpit capsule may be about 2 feet to about 2½ feet. With such dimensions, the cockpit capsule may have a ballistic or aerodynamic shape, and a relatively low volume and wind resistance as compared to the traditional cockpit. Of course, the dimensions and shape of the cockpit capsule may be changed by one ordinarily skilled in the art, in order to lower the volume within the cockpit and the wind resistance, and to allow the pilot to lean over and look back at the cockpit capsule.

FIGS. 7 and 9 illustrate by way of example a traditional cockpit 212 where a pilot 210 is sitting in a substantially upright position, i.e., not being able to lean back beyond 30°; and wearing an anti-gravity suit. Moreover, since the thigh support 214 in the traditional cockpit 212 is more leveled than the thigh support 4 of the present invention, the knees 216 of the pilot 210 are generally leveled with the buttock 218 of the pilot 210, when compared to the knees of the pilot sitting in the thigh support 4. For example in FIG. 8, the knees 216' of the pilot sitting in thigh support 4 are elevated relative to the buttock 218'. Such elevation in the knees of the pilot allows the pilot to handle greater G-forces because elevated knees act as a dam to resist blood flow from upper torso to the lower torso.

That is, with the knees raised, the thighs of the pilot are raised as well, which means that blood in the upper torso must flow up the veins in the thighs and, therefore acts as a dam to resistant the flow of blood from the upper torso to the lower torso. This means that a pilot is sitting in the seat 2 with its knees raised, will have less blood flow out of its head than a pilot sitting in a traditional pilot seat, when subjected to the same G-force; and therefore, the pilot sitting the seat 2 will less likely blackout. So a pilot sitting with its knees raised wearing an anti-gravity suit and laying beyond 30° may be able to take 14 G or more without blacking out.

As illustrated in FIG. 8, an exemplary angle (∝) between the horizontal plane and thigh support 4, may be about 0° to about 90°. Of course, the angle ∝ may vary further depending on the reclined position of the seat back 12. And one ordinarily skilled in the art may vary the angle ∝, depending on a particular design or application. In particular, as long as raising the knees do not obstruct the pilot's 18° visibility requirement, the knees may be raised for pilot's comfort and to act as a dam.

Figure 10:
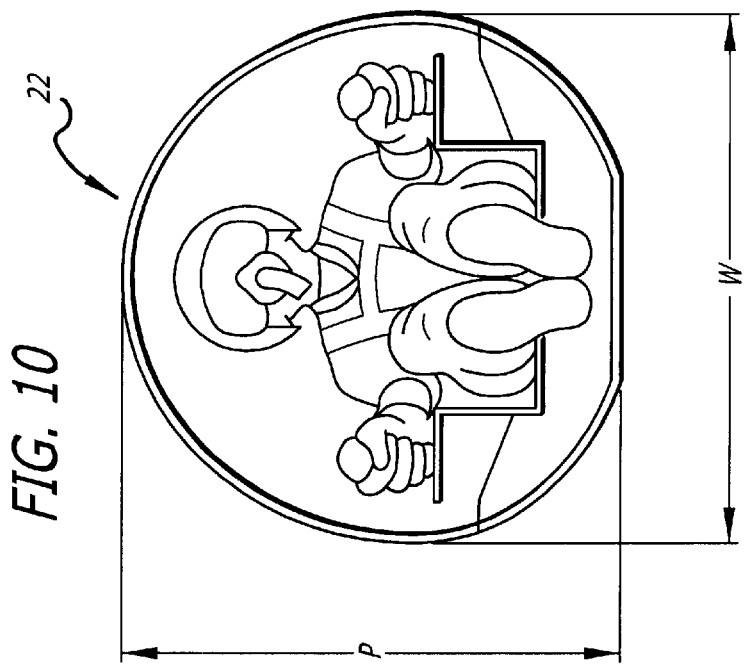
FIG. 10 is a front profile view of cockpit capsule according to FIG. 8.

Still further as illustrated in FIG. 9, the profile of the traditional cockpit 212 is relatively high when compared to the profile of the cockpit capsule 22 of the present invention, as illustrated by way of example in FIG. 10. This of course increases the drag on the aircraft.

As illustrated by way of example in FIG. 8, still another embodiment of the present invention is to have a cockpit capsule for two pilots, i.e., and a pilot in front space 200 and a copilot in the back space 202 of the capsule 22'. To do so, the capsule 22' may be elongated to add a second copilot seat in the back space 202 and maintain the profile and the width of the capsule 22. In this embodiment, another rocket may be added to compensate for the added weight of the capsule and copilot. Again, the rockets may be arranged so that the tip of the capsule lifts first.

There are number of advantages to ejecting a pilot in the cockpit capsule 22, as in this embodiment. For example, the pilot may eject at a higher speed because the cockpit capsule protects the pilot from sudden impact from the wind as the capsule initially ejects from the aircraft, and since the pilot is in greater reclined position, the pilot can take greater G force during ejection. Additionally, the pilot may eject from higher altitude as well, because the capsule insulates the pilot form the cold, and since the pilot is already equipped with an oxygen mask, continuous oxygen is provided. Moreover, the capsule insulates the pilot from rain, hail, lightning, and the explosion from the aircraft. During landing, the capsule protects the pilot as well by floating on water or from enemy gun fire. Yet another advantage is the faster ejection time because there is no need to retract the pilot's arms and legs; nor the need to remove the canopy first before ejecting. Also, a smaller capsule means that less air needs to be regulated so that the auxiliary equipment can be smaller and consume less energy. Still another advantage of having a smaller capsule, which weights less is that less thrust and lift are needed to propel the aircraft, and therefore the wings may be smaller and consume less fuel.

With regard to material, the canopy may be made of polycarbonates, thermoplastic, carbon fiber, carbon foam, titanium or the like aerospace materials that have high strength and allows the user to see through the material. Moreover, the material may be any type of material that may be developed in the future.

In closing, it is noted that specific illustrative embodiments of the invention have been disclosed hereinabove. However, it is to be understood that the invention is not limited to these specific embodiments. For example, the movable panel may be utilized to make more efficient use of limited space in other cockpit or control room designs, such as commercial aircraft, helicopters, submarines, ships, space vehicles (i.e., shuttle) and even automobiles. In other words, the exemplary cockpit described in the present invention is not limited a military fighter aircraft, such as F-15 and F-16 fighter aircraft. Still another alternative is to have a cockpit capsule adjacent to the cockpit capsule illustrated in FIG. 6, for a co-pilot.

With respect to the claims, it is applicant's intention that the claims not be interpreted in accordance with the sixth paragraph of 35 U.S.C. §112 unless the term "means" is used followed by a functional statement.

What is claimed is:

1. A movable panel within a cockpit, comprising:
    a panel having an edge, the edge of the panel pivotally coupled to a cockpit, wherein the panel pivots between a first position and a second position, wherein the panel houses at least a portion of the cockpit instruments, wherein:
        in the first position, the panel is in substantially an upright position; and
        in the second position, at least a portion of the panel extends across a thigh support of a seat.

2. A movable panel according to claim 1, wherein in the first position, a pilot is able to sit and get out of the seat.

3. A movable panel according to claim 1, wherein the seat has a side wall, the panel pivotally coupled to the side wall.

4. A movable cockpit panel, comprising:
a panel having an edge;
wherein the edge of the panel is adapted to movably couple within a cockpit between a first position and a second position, wherein:
the panel in the first position, a pilot is able to ingress and egress from a pilot seat within the cockpit; and
the panel in the second position, at least a portion of the panel housing at least a portion of the cockpit instruments extends across a thigh support of the pilot seat within the cockpit.

5. A movable panel according to claim 4, wherein the seat has a side wall, wherein the edge of the panel is pivotally coupled to the side wall of the seat.

6. A movable panel according to claim 4, wherein the panel has a facing surface, wherein the facing surface of the panel displays at least a portion of the cockpit instruments.

7. A movable panel according to claim 6, wherein the cockpit instrument is a control instrument.

8. A movable panel according to claim 4, wherein the cockpit is a cockpit for a fighter aircraft.

9. A movable panel according to claim 4, wherein in the first position the panel is disengaged from the cockpit.

10. A movable panel according to claim 4, wherein in the first position the panel is in a substantially upright position coupled to the cockpit.

11. A movable panel according to claim 4, wherein in the second position, the panel is substantially parallel to the thigh support.

12. A movable panel according to claim 4, wherein the panel has a substantially rectangular configuration.

13. A movable panel according to claim 4, wherein the panel is pivotally coupled within the cockpit.

14. A system to allow a seat in a cockpit of a fighter aircraft to further recline, and allow a pilot sitting in the seat to maintain at least a predetermined angle view below the horizontal plane over a front console of the cockpit, comprising:
a front console within a cockpit having a base, the front console having a height above the base of the cockpit and a surface area to house a predetermined number of cockpit instruments;
a seat within the cockpit, the seat having a seat back adapted to recline at least beyond 40° from the vertical plane and a thigh support to support a pilot;
a panel adapted to be movable between a first position and a second position within the cockpit, wherein in the first position the thigh support is substantially exposed, and in the second position the panel is coupled within the cockpit and substantially covering the thigh support, the panel housing at least one cockpit instrument;
wherein the at least one cockpit instrument housed in the panel reduces the predetermined number of cockpit instruments that needs to be housed in the front console to reduce the surface area needed in the front console to house the predetermined number of cockpit instruments,
wherein the reduced surface area of the front console lowers the height of the front console and allows the pilot to further recline the seat back and still maintain the predetermined angle view below the horizontal plane over the front console.

15. A system according to claim 14, wherein the predetermined angle view below the horizontal plane over the front console of the cockpit is at least 18°.

16. A system according to claim 14, wherein in the first position the panel is disconnected with the cockpit.

17. A cockpit capsule to safely eject a pilot from an aircraft, comprising:
a first cockpit;
a first seat within the first cockpit; and
a first canopy adapted to enclose the first cockpit, the first cockpit adapted to eject from an aircraft with a pilot entering through the top of the first canopy and sitting on the first seat enclosed by the first canopy, whereby the enclosed first cockpit protects the pilot inside from the environment during the ejection.

18. A cockpit capsule according to claim 17, further including:
a second cockpit adjacent to the first cockpit;
a second seat within the second cockpit;
a second canopy adapted to enclose the second cockpit, the second cockpit adapted to eject from the aircraft with a co-pilot sitting on the second seat enclosed by the second canopy, whereby the enclosed second cockpit protects the co-pilot inside from the environment during the ejection.

19. A cockpit capsule according to claim 17, further including:
a second seat within the first cockpit for a co-pilot.

20. A cockpit capsule according to claim 17, further including:
a predetermined number of cockpit instruments within the first cockpit to fly a fighter aircraft;
a panel adapted to couple within the first cockpit, the panel being movable between first and second positions, wherein in the first position the pilot is able to sit in the first seat, in the second position at least a portion of the panel covers a thigh support of the first seat;
wherein at least a portion of the predetermined number of cockpit instruments are housed in the panel to make more efficient use of the space in the first cockpit capsule to make the first cockpit capsule smaller and lighter; and
at least one ejection rocket coupled to the first cockpit to eject the first cockpit capsule from the aircraft.

21. A cockpit capsule according to claim 17, wherein:
the first canopy has a lip;
the first cockpit has an outer edge; and
the lip of the first canopy adapted to mate with the outer edge of the first cockpit.

22. A cockpit capsule according to claim 17, wherein the panel is electrically coupled to the first cockpit.

23. A cockpit capsule according to claim 17, wherein one of the predetermined cockpit instruments is a sensor adapted to detect a plurality of emergency conditions, wherein upon a detection of any one of the plurality of emergency conditions, the sensor sets off the at least one rocket to eject the first cockpit capsule from the fighter aircraft.

24. A cockpit capsule according to claim 17, wherein the panel is pivotally coupled to the first cockpit, wherein the panel pivots between the first and second positions.

25. A cockpit capsule according to claim 17, wherein the first seat has a first seat back, wherein the first seat back is adjustable to recline at least beyond 40° from the vertical plane, wherein reclining the first seat back beyond 40° from the vertical plane further lowers the profile of the first cockpit capsule to reduce the weight and drag of the first cockpit capsule.

26. A cockpit capsule according to claim 17, wherein the first seat has a thigh support and a first seat back, the thigh support is adjustable up and down, and the first seat back is adjustable back and forth.

27. A cockpit capsule according to claim 17, including a foot peddle moveably coupled to the first cockpit, wherein the foot peddle is adjustable substantially along the axis of the pilot's tibia.

28. A cockpit capsule according to claim 17, wherein the first canopy has a leading edge and the first cockpit has a leading edge, wherein the leading edge of the first canopy is pivotally coupled to the leading edge of the first cockpit.

29. A cockpit capsule according to claim 17, including a back frame to enclose the aft side of the first canopy and the first cockpit.

30. A cockpit capsule according to claim 17, wherein the first seat has a cushion filled with a gel material.

31. A cockpit capsule according to claim 17, wherein the first cockpit capsule is adapted to protect the pilot from the outside environment.

32. A method of safely ejecting a pilot in a cockpit, comprising the steps of:
providing a cockpit capsule adapted to separate from an airplane, the cockpit capsule adapted to protect a pilot within the cockpit capsule from the environment, wherein the pilot enters from the top of the cockpit capsule, wherein the cockpit capsule includes a seat for the pilot; and
separating the cockpit capsule from the airplane.

33. A method according to claim 32, further including steps of:
coupling within the cockpit capsule a panel movable between a first position and a second position; wherein in the second position at least a portion of the panel covers the lap of the pilot sitting in the seat; and
housing at least a portion of cockpit instruments within the first cockpit capsule on the panel.

34. A method according to claim 32, including at least one rocket coupled to the first cockpit capsule to separate the cockpit capsule from the airplane.

35. A method according to claim 32, including the steps of:
securing the pilot to the seat, wherein the pilot is in a reclined position at least beyond 40° from the vertical plane.

36. A method according to claim 32, wherein the cockpit capsule includes a cockpit and a canopy adapted to enclose the cockpit.

37. A method for providing a pilot seat in a cockpit of an aircraft having a limited space that is adjustable, comprising the steps of:
providing a movable panel adapted to couple to a pilot seat in an aircraft cockpit, the movable panel adapted to move between a first position and a second position, wherein in the second position at least a portion of the movable panel covers the lap of a pilot sitting in the pilot seat;
incorporating at least a portion of the cockpit instruments to the movable panel, thereby saving space within the aircraft cockpit; and
reclining the pilot seat beyond at least 30° due to the movable panel saving space within the aircraft cockpit.

38. A method according to claim 37, wherein the cockpit is separable from the aircraft.

39. A method according to claim 37, wherein the pilot seat has a thigh support, wherein the thigh support is elevated to have an angle that is at least 8° from the horizontal plane.

40. A movable panel within a cockpit, comprising:
a panel having an edge, wherein the edge of the panel is adapted to movably couple within a cockpit between a first position and a second position,
wherein in the first position, the panel is in substantially an upright position; and
wherein in the second position, at least a portion of the panel extends across a thigh support of a seat; and
a facing surface housing at least one control instrument.

41. A movable panel within a cockpit, comprising:
a panel having an edge, the edge of the panel pivotally coupled to a cockpit, wherein the panel pivots between a first position and a second position, wherein the panel houses one display instrument, wherein:
in the first position, the panel is in substantially an upright position; and
in the second position, at least a portion of the panel extends across a thigh support of a seat.

* * * * *